(12) United States Patent
Corodescu et al.

(10) Patent No.: US 12,373,588 B2
(45) Date of Patent: Jul. 29, 2025

(54) ACCESS CONTROL VERIFICATION IN KNOWLEDGE GRAPHS BY UTILIZING DYNAMIC NODE-BASED ACCESS CONTROL CACHES

(71) Applicant: Microsoft Technology Licensing, LLC, Redmond, WA (US)

(72) Inventors: Andrei-Alin Corodescu, Oslo (NO); Gjorgji Rankovski, Oslo (NO); Charitha Herath Daskon Herath Mudiyanselage, Oslo (NO); Åge Andre Kvalnes, Fetsund (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 222 days.

(21) Appl. No.: 18/077,017

(22) Filed: Dec. 7, 2022

(65) Prior Publication Data

US 2024/0143818 A1    May 2, 2024

Related U.S. Application Data

(60) Provisional application No. 63/421,027, filed on Oct. 31, 2022.

(51) Int. Cl.
*H04L 29/06* (2006.01)
*G06F 21/60* (2013.01)
*G06F 21/62* (2013.01)

(52) U.S. Cl.
CPC ........ *G06F 21/6218* (2013.01); *G06F 21/604* (2013.01); *G06F 2221/2141* (2013.01)

(58) Field of Classification Search
CPC ..... G06F 21/62; G06F 21/6218; G06F 21/604
See application file for complete search history.

(56) References Cited

U.S. PATENT DOCUMENTS

| | | | |
|---|---|---|---|
| 7,185,047 B1 * | 2/2007 | Bate | H04L 63/08 726/17 |
| 8,528,041 B1 * | 9/2013 | Haney | H04L 63/18 713/153 |

(Continued)

FOREIGN PATENT DOCUMENTS

CN    113591049 A    11/2021

OTHER PUBLICATIONS

International Search Report and Written Opinion received for PCT Application No. PCT/US2023/032819, Dec. 18, 2023, 12 pages.

(Continued)

*Primary Examiner* — Jason K Gee
(74) *Attorney, Agent, or Firm* — Ray Quinney & Nebeker P.C.; Christopher Hallstrom

(57) ABSTRACT

The present disclosure describes utilizing an access control cache associated with a key resource (e.g., node) of a knowledge graph that quickly and efficiently reduces the uncertainty of which other resources (e.g., connected nodes) in a knowledge graph are accessible to a given user identifier. For example, a node caching system dynamically generates, updates, manages, and utilizes access control caches associated with key nodes to signal access control rights of connected nodes in a knowledge graph with respect to a user identifier. In many instances, the node caching system improves efficiency over existing knowledge graph systems by providing access control rights information of connected nodes from an access control cache of a key node without needing to traverse the knowledge graph to other nodes or to travel to other connected nodes stored on separate computing devices.

20 Claims, 12 Drawing Sheets

(56) References Cited

U.S. PATENT DOCUMENTS

| | | | |
|---|---|---|---|
| 8,990,329 B1* | 3/2015 | Khvostichenko | H04L 63/101 709/206 |
| 9,998,472 B2 | 6/2018 | Verweyst et al. | |
| 11,216,492 B2 | 1/2022 | Meyerzon et al. | |
| 2015/0095303 A1 | 4/2015 | Wu et al. | |
| 2017/0177648 A1 | 6/2017 | Obbard | |
| 2018/0182191 A1* | 6/2018 | Wagstaff | G06F 12/0804 |
| 2019/0266336 A1* | 8/2019 | Scheideler | G06F 21/6218 |
| 2019/0312869 A1 | 10/2019 | Han et al. | |
| 2021/0042438 A1 | 2/2021 | Scheideler et al. | |
| 2021/0409416 A1* | 12/2021 | Reyna Fernandez | H04L 51/18 |
| 2022/0012354 A1 | 1/2022 | Zoratti et al. | |
| 2022/0019905 A1 | 1/2022 | Meyerzon et al. | |

OTHER PUBLICATIONS

Valzelli, et al., "A Fine-grained Access Control Model for Knowledge Graphs", In Proceedings of the 17th International Joint Conference on e-Business and Telecommunications, vol. 2, 2020, pp. 595-601.

* cited by examiner

Access Control Cache for Project P *300*

Access Control Table *310*

| Key *312* (Node) | Value *314* (Access Control Rights) | Timestamp *316* (Last Update) |
| --- | --- | --- |
| B. | Alice, Bob, Charlie | Time 3 |
| D. | Alice, Bob | Time 1 |
| F. | Bob's Team | Time 4 |
| G. | Bob's Team | Time 2 |
| I. | Bob, Charlie | Time 5 |

Reference Table *320*

| Short-Form Identifier *322* | Long-Form Identifier *324* |
| --- | --- |
| Bob's Team | Alice, Bob Charlie, Daisy, Eva |

FIG. 3

ACCESS CONTROL VERIFICATION IN KNOWLEDGE GRAPHS BY UTILIZING DYNAMIC NODE-BASED ACCESS CONTROL CACHES

CROSS REFERENCE TO RELATED APPLICATIONS

This application claims benefit and priority to Provisional Patent Application No. 63/421,027, filed on Oct. 31, 2022 the entirety of which is incorporated herein by reference.

BACKGROUND

A knowledge graph is a collection of resources (e.g. documents, identifiers, profiles, services, communications, and other resources) that are often relevant to an entry, group, topic, theme, or other collection. For example, an enterprise knowledge graph corresponds to resources relevant to a given enterprise, such as an entity, school, and/or company. A knowledge graph (sometimes called a network graph) includes nodes connected by edges, where the nodes represent resources and the edges represent relationships between the resources. In many instances, a knowledge graph system provides an interface for users to interact with and obtain answers from the knowledge graph.

To illustrate, in some instances, an existing knowledge graph system answers graph queries by analyzing nodes and their relationships, which includes traversing across multiple nodes of a knowledge graph. For example, if a team leader queries the knowledge graph system regarding the projects on which a given team member is working, the knowledge graph system can traverse the knowledge graph to discover which projects the given team member has recently viewed or modified.

For many knowledge graphs, such as enterprise knowledge graphs, the resources are governed by access control policies and protections, that permit or restrict access as appropriate. To illustrate, in the above example, the team leader may have access to resources and data not permitted to one or more team members or to members of another team. Because of these access control policies, before queries are performed, a knowledge graph system must ensure that the user performing the query has the appropriate permissions to access the given resources. Indeed, when traversing a knowledge graph to answer a user's graph query, existing knowledge graph systems are faced with the challenging issue of determining which resources the user has permission to access. Currently, existing knowledge graph systems fail to efficiently solve this problem.

To elaborate, in response to receiving a graph query or question from a user, some knowledge graph systems must perform initial access control checks between the user and given resources to determine access rights before using the given resources to answer queries for the user. In these cases, the knowledge graph systems traverse the knowledge graph multiple times, such as a first pass to identify access control rights and a second pass to access permitted resources. Unfortunately, traversing the same portions of a knowledge graph multiple times is inefficient and often wastes computing resources, especially if the user does not have access to a given resource.

Some knowledge graph system attempt to overcome the above issues by checking access to resources and accessing resource content as part of a single map traversal. However, even in these cases, existing knowledge graph systems still suffer from inefficiencies. For instance, many knowledge graphs are frequently distributed across multiple devices that pool common resources, which often requires existing knowledge graph systems to traverse to nodes on other computing devices in the knowledge graph. In these cases, existing knowledge graph systems undergo additional overhead due to connection setup costs as well as expensive roundtrip remote traversals costs, such as loading data into memory on the local device from the storage of the remote device and potentially returning data (assuming the user has access) that does not end up being used by the local device for the final query result.

As another example, in a distributed knowledge graph, existing knowledge graph systems sometimes perform duplicative access checks on a given resource and sometimes from different computing devices (e.g., Device A and Device B both send a request regarding the same given resource on Device C). In these cases, the knowledge graph systems inefficiently perform unnecessary duplicative checks across multiple computing devices, especially if the given resource returns a negative response that one or more users do not have the right to access the given resource.

These and other problems result in significant inefficiencies of existing knowledge graph systems with respect to managing access to resources shared across knowledge graphs.

BRIEF DESCRIPTION OF THE DRAWINGS

The detailed description provides one or more implementations with additional specificity and detail through the use of the accompanying drawings, as briefly described below.

FIG. 3 illustrates an example of an access control cache for a node in a knowledge graph in accordance with one or more implementations.

DETAILED DESCRIPTION

Figure 1A:
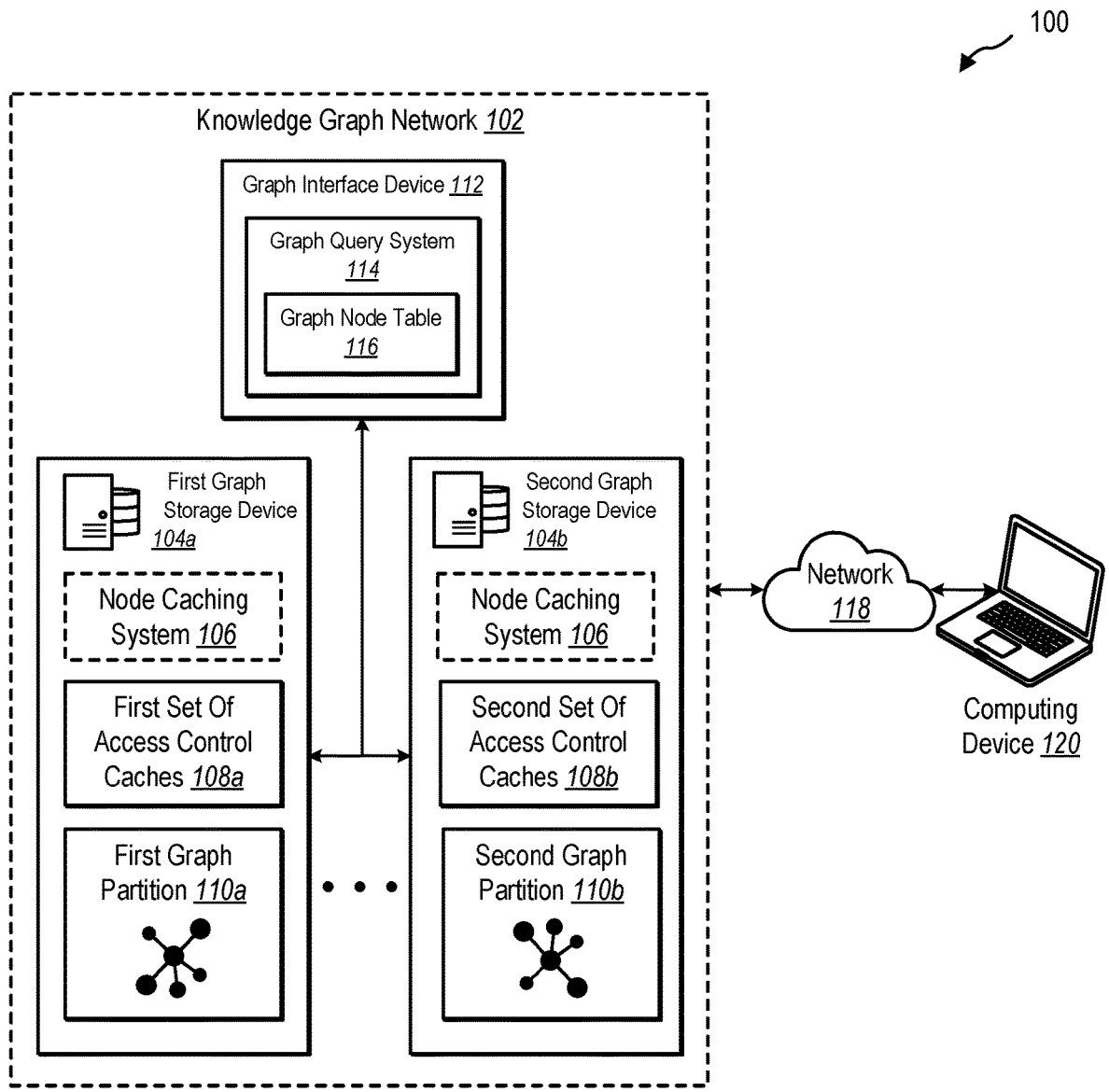
FIGS. 1A-1B illustrate an example diagram of a computing system environment where a node caching system is implemented in accordance with one or more implementations.

The present disclosure describes utilizing an access control cache associated with a key resource (e.g., node) of a knowledge graph that quickly and efficiently reduces the uncertainty of which other resources (e.g., connected nodes) in a knowledge graph are accessible to a given user identifier. To elaborate, implementations of the present disclosure provide benefits and/or solve one or more of the foregoing or other problems in the art with systems, computer-readable media, and methods by providing a node caching system that dynamically generates, updates, manages, and utilizes access control caches associated with key nodes to signal access control rights of connected nodes in a knowledge graph with respect to a user identifier.

To briefly illustrate, a graph query system associated with a knowledge graph receives a graph query that includes a user identifier. To answer the graph query, the graph query system traverses multiple nodes in the knowledge graph to first verify that the user identifier has access to these nodes and then to access the content of the nodes, if authorized. For example, the node graph system finds a key or target node that satisfies the criteria of the graph query. The graph query system then traverses the knowledge graph from the target node to find additional nodes that also satisfy the criteria of the graph query, as many of these connected nodes also correspond to the graph query. In this document, nodes that connect, directly or indirectly, from a given target node are called traversed nodes.

In many implementations, the node caching system (i.e., a node access control caching system) generates an access control cache for the target node that includes a subset of traversed nodes, which are connected to the target node or that satisfy the graph query criteria. For each traversed node included in the subset of traversed nodes listed in the access control cache of the target node, the node caching system generates an access control rights entry (or simply "entry"), which includes a copy of the access control rights of the traversed node. In various implementations, the node caching system also dynamically and automatically updates which traversed nodes are included in an access control cache, refreshes the information of entries, removes stale entries, and adds new entries for recently activated traversed nodes.

As an example, when a graph query for a user identifier arrives, rather than traversing the traversed nodes of a target node in a knowledge graph multiple times to verify if the user identifier is allowed access control rights (or simply "access") to the traversed nodes, the node caching system utilizes the access control cache associated with the target node to quickly and efficiently look up access control rights for the traversed nodes. If the access control cache includes an entry for a given traversed node that indicates that the user identifier does not have access to the given traversed node, the node caching system efficiently prevents the node graph system from traversing the knowledge graph to the given traversed node for either access verification or to analyze the content of the given traversed node—both which would inefficiently waste computing power and resources. If, on the other hand, access is granted, the node caching system permits the node graph system to verify access with the given traversed node and/or access the content of the given traversed node.

As described herein, the node caching system provides several technical benefits in terms of improving efficiency compared to existing knowledge graph systems. Indeed, the node caching system provides several practical applications that deliver benefits and/or solve problems associated with efficiently verifying the access control rights of resources for identifiers and traversing knowledge graphs.

To illustrate, in many implementations, the node caching system eliminates or reduces the uncertainty associated with whether resources represented by traversed nodes of a target node are accessible to a user identifier. For example, in many instances, the node caching system utilizes an access control cache linked to a target node to indicate whether traversed nodes grant or deny access control rights to a user identifier without having to traverse the knowledge graph to the traversed nodes, which improves efficiency over existing knowledge graph systems. For instance, when access control rights are not granted to traversed nodes of a target node, the steps of traversing the knowledge graph to these nodes are skipped and computing resources are saved.

Additionally, the node caching system reduces the memory and resources needed to store each of the access control caches by generating and maintaining access control caches for target nodes that include only a subset or portion of potential traversed nodes of the target node. In particular, not all traversed nodes connected to a target node are included in the access control cache of the target node and the node caching system clears out stale and outdated entries. In various implementations, the access control cache includes entries for the subset of traversed nodes that are actively being called in response to graph queries. In this manner, the subset of traversed nodes in an access control cache includes a subset of traversed nodes that are most likely to be used in upcoming graph queries, which results in efficiencies to the node graph system in more quickly answering graph queries.

This benefit is compounded when calls to a traversed node result in communicating with other computing devices. Indeed, by maintaining an access control cache for a target node on a first device, the node caching system prevents calls to traversed nodes stored on other devices (e.g., in the common case that the knowledge graph is distributed across multiple devices). This, in turn, results in less overhead by not having to establish connections between different devices, fewer latency problems, and quicker query responses.

In addition, by intelligently and dynamically updating the access control cache for a target node, the node caching system provides the above efficiency improvements without impeding the query process. For example, when a traversed node receives a request to verify whether a user identifier has access control rights, the node caching system first responds to the request. Next, the node caching system sends a separate communication to the target node indicating the access control rights information for all users and/or groups of the traversed node. Upon receiving this information, the node caching system updates the access control cache with current access control rights information of the traversed node for all user identifiers and/or group identifiers. Often, the node caching system sends the access control rights information of the traversed node separately as part of a background service to ensure other services (e.g., responding to the graph query) are not interrupted.

Further, by providing access control rights information of a traversed node in response to the traversed node receiving an access control rights verification request, the node caching system ensures that the access control cache of the target node includes access control rights information for current and relevant traversed nodes. Stated another way, the node caching system does not populate the access control cache of a target node with traversed nodes of the target node that have not been included in recent graph query behavior patterns.

As another example, by generating and utilizing access control caches for target nodes, which are located within the target node, or at least on the same computing device as a corresponding target node, the node caching system prevents data duplication requests. For example, because access control rights information for traversed nodes is accessible from the access control cache of a target node on a single device, additional verification requests often do not need to be made across devices, thus saving duplicative calls.

As illustrated in the foregoing discussion, the present disclosure utilizes a variety of terms to describe the features and advantages of one or more implementations described herein. For instance, the term "knowledge graph" refers to a type of network graph that includes nodes connected via edges. In particular, a knowledge graph maps relationships between resources, devices, and/or services in a graph structure. A knowledge graph can be two-dimensional, three-dimensional, or n-dimensional. In various implementations, a knowledge graph is distributed across multiple computing devices.

In some implementations, a knowledge graph refers to a collection of resources (e.g. documents, identifiers, profiles, digital content items, objects, services, communications, and other resources) that are often relevant to an entry, group, topic, theme, or other collection. In many implementations, resources in a knowledge graph are represented as nodes, and relationships between resources in the knowledge graph are represented as edges. In various implementations, the knowledge graph includes nodes that represent information derived from the content of other nodes.

As mentioned above, a knowledge graph stores information and allows users to ask questions regarding the knowledge graph. For example, a node graph system answers questions, which are provided in the form of a graph query, by traversing nodes of the knowledge graph, analyzing the content of relevant, identifying answers, and returning the answers to questions.

Accordingly, the term "graph query" refers to a request from a user identifier for the information included or derived from the knowledge graph. In particular, a graph query system, which answers graph queries, receives a graph query from a computing device associated with the user identifier. Additionally, a graph query includes one or more questions or criteria that can be answered, in part, by traversing one or more nodes of the knowledge graph.

In various implementations, the graph query system identifies one or more target nodes as part of responding to a graph query. In this document, the terms "target node" or "key nodes" refer to a node in the knowledge graph that matches one or more criteria of the graph query. For example, the graph query system identifies a set of candidate nodes that satisfies initial criteria of the graph query, which can include a large number of nodes. In some cases, if one of the nodes in the candidate set connects (e.g., directly or indirectly within a predetermined number of node hops) with multiple nodes in the candidate set, the node caching system and/or the graph query system designates this node as a target node. In various implementations, the node caching system selects one or more target nodes from the candidate set based on other factors.

Upon selecting a target node, the graph query system can traverse the knowledge graph to other nodes in the candidate set that are connected to the traversed node. Accordingly, the term "traversed node" refers to nodes connected to a target node via one or more edges. In various implementations, a traversed node is connected to the target node within a predetermined number of node hops (e.g., two, three, five, ten). In many implementations, the traversed nodes are in the same candidate set as the traversed node. In alternative implementations, while the target node is in the candidate set, one or more traversed nodes are located outside of the candidate set (e.g., but still within a predetermined number of node hops from a node in the candidate set). In some implementations, a traversed node is located on a different computing device than the target node.

As noted above, many knowledge graphs are governed by access control policies. As used herein, the term "access control data" refers to a set of rules indicating which user identifiers, device identifiers, group identifiers, and/or system identifiers are allowed access to a given node or resource. For example, the access control data of a node indicates which user identifiers have permission to access the content of the node. In some implementations, the access control data indicates which identifiers are excluded from accessing a given node (e.g., an identifier denylist).

Additionally, the term "access control rights" refers to whether an identifier has permission to access a given node. For example, the graph query system determines whether a user identifier has access control rights to analyze the content of a traversed node. Similarly, the term "access control rights information" refers to the collective access control rights of a node, such as all the identifiers that are allowed or denied access control rights to the node. Often, access control rights information is sent in a message or package to a target node to store in an access control cache of the target node.

The term "access control cache" refers to a data structure associated with a target node that stores access control rights information for traversed nodes of the target node. In various implementations, the access control cache of a target node is located within the target node, close to the target node, or at least on the same computing device as the target node. In various implementations, an access control cache includes access control rights entries having access control rights information for a subset of the traversed nodes. In various implementations, the node caching system dynamically updates and manages the access control caches. Additional details regarding access control caches are provided below.

Figure 1B:
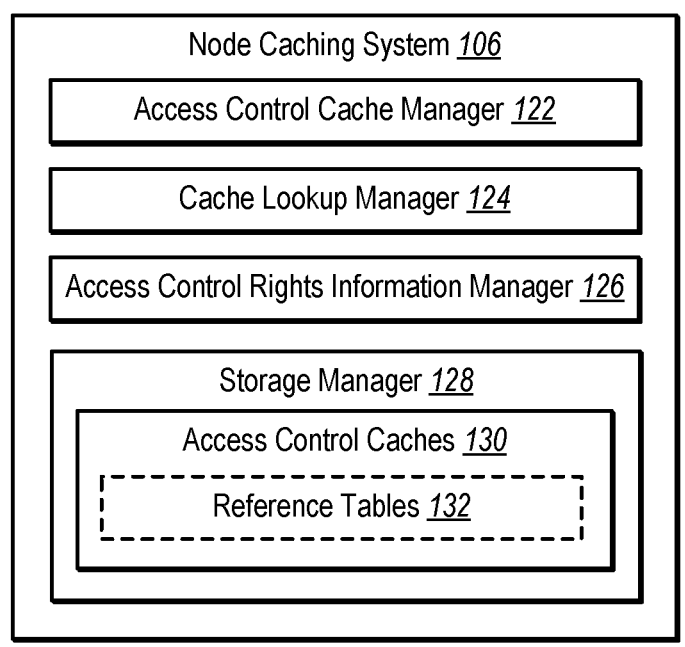

Additional details are now provided regarding the components, elements, and functions of the node caching system. For example, FIGS. 1A-1B illustrate a schematic diagram of an environment 100 (i.e., a digital medium system environment) for implementing a node caching system 106. In particular, FIG. 1A includes the environment 100 and FIG. 1B provides additional detail regarding the components and elements of the node caching system 106.

As shown in FIG. 1A, the environment 100 includes a knowledge graph network 102 and a computing device 120 connected via a network 118. As shown, the knowledge graph network 102 includes various types of computing devices. The term "computing device" refers to a server device, a client device, or another type of computing device. Additional details regarding computing devices as well as networks, such as the network 118, are provided below in connection with FIG. 9.

As mentioned, the environment 100 includes the computing device 120. Among various implementations, the computing device 120 is a user client device associated with a user represented by a user identifier. While only a single instance of the computing device 120 is shown, the environment 100 can include any number of computing devices associated with user identifiers. In some implementations, the computing device 120 is associated with a group identifier and/or a system identifier.

As also mentioned, the environment 100 includes the knowledge graph network 102, which includes multiple computing devices. In particular, the knowledge graph network 102 includes a first graph storage device 104a, a second graph storage device 104b, and a graph interface device 112. Each device shown can be a single device or a set of multiple devices. Additionally, if a knowledge graph is large, as is common, the knowledge graph can be distributed across a large number of graph storage devices. For example, the knowledge graph network 102 may need more graph storage devices to fully store the knowledge graph.

Additionally, as shown, the graph interface device 112 includes a graph query system 114 and a graph node table 116. As also shown, the first graph storage device 104*a* includes the node caching system 106, a first set of access control caches 108*a*, and a first graph portion 110*a*. Similarly, the second graph storage device 104*b* includes the node caching system 106, a second set of access control caches 108*b*, and a second graph portion 110*b*.

Notably, the node caching system 106 is shown with dashed lines to indicate that the node caching system 106 may be located on different computing devices. For example, a first instance of the node caching system 106 is implemented on the first graph storage device 104*a* and a second instance of the node caching system 106 is implemented on the second graph storage device 104*b*. Accordingly, some or all of the node caching system 106 can be located on different computing devices. Further, in various implementations, some or all of the node caching system 106 is located on the graph interface device 112, such as within the graph query system 114.

In various implementations, the graph query system 114 receives and responds to graph queries from computing devices outside of the knowledge graph network 102. For example, the computing device 120 provides a graph query to the knowledge graph network 102 that includes a question and the user identifier of the user asking the question. In response, the graph query system 114 on the graph interface device 112 receives the graph query and functions as a query executor to answer the graph query. In various implementations, the graph query system 114 utilizes the graph node table 116 to identify a candidate set of nodes that match an initial set of criteria for the graph query. In addition, the graph query system 114 (or the node caching system 106) identifies one or more target nodes (e.g., key nodes that are frequent targets of graph queries) in the candidate set, including on which graph storage device a given target node is located.

To answer the graph query, the graph query system 114 verifies access control rights with a target node before accessing the content of the target node. Additionally, the graph query system 114 identifies traversed nodes connected to the target node to better answer the graph query. As also mentioned, many of the target nodes are connected to a local access control cache (e.g., an individual or shared local access control cache) where the access control cache includes access control rights information for relevant corresponding traversed nodes. In various implementations, a target node and a corresponding access control cache are located on the same computing device, often close to each other.

Additionally, rather than traversing the first graph portion 110*a* and/or the second graph portion 110*b* to determine access control rights for the user identifier, the graph query system 114 utilizes an access control cache associated of a target node to determine if the user identifier has access control rights to particular traversed nodes of the target node. In many instances, the graph query system 114 need not send communications between the different computing devices within the knowledge graph network 102 as the access control cache provides all the necessary access control rights information.

As noted above, the graph query system 114 is able to more efficiently fulfill graph queries because the node caching system 106 provides intelligent, dynamic, and automatically maintained access control caches. As mentioned above, FIG. 1B provides additional detail regarding the capabilities and components of the node caching system 106 to perform a variety of functions. To illustrate, FIG. 1B shows an example configuration of components used by the node caching system 106.

As shown, the node caching system 106 includes an access control cache manager 122, a cache lookup manager 124, an access control rights information manager 126, and a storage manager 128. As also shown, the storage manager 128 includes access control caches 130. In some implementations, the access control caches 130 include reference tables 132, as shown.

As mentioned, the node caching system 106 includes the access control cache manager 122. In one or more implementations, the access control cache manager 122 manages the access control caches 130. For example, the access control cache manager 122 generates, accesses, updates, modifies, refreshes, purges, and/or otherwise manages the access control caches 130. In various implementations, the access control cache manager 122 generates, updates, and maintains an access control cache for a node in a knowledge graph. For instance, the access control cache manager 122 builds and updates an access control cache as access control rights information is sent to the target node from traversed nodes, as further described below.

In various implementations, the access control cache manager 122 removes or purges stale entries in the access control caches 130. For example, the access control cache manager 122 determines which entries (i.e., access control rights entries) have an updated timestamp beyond a staleness threshold and, if so, removes the entry from the cache. In this manner, the access control cache manager 122 ensures that only relevant and fresh entries are maintained within the access control cache. Furthermore, the access control cache manager 122 may perform additional actions to ensure that an access control cache only includes a subset of traversed nodes of a target node (i.e., the subset includes fewer nodes than all of the traversed nodes).

As shown, the node caching system 106 includes the cache lookup manager 124. In various implementations, the cache lookup manager 124 accesses, reads, identifies, determines, and/or looks up entries in an access control cache of a target node. For example, upon identifying one or more traversed nodes for a target node, the cache lookup manager 124 determines which of these traversed nodes are included in the access control cache. Furthermore, the cache lookup manager 124 determines the access control rights of each traversed node having an entry in the access control cache.

In various implementations, the cache lookup manager 124 utilizes the reference tables 132 when looking up entries in the access control caches 130. For example, the access control cache manager 122 stores values in an entry that includes a pointer, reference, shortcut, or short-form identifier, where the full, long-form, or original identifier is found in a reference table within or proximate to the access control cache. In this manner, as a given identifier is repeated in a number of entries in an access control cache, memory is saved by requiring less space and resources to store the short-form identifier.

Additionally, the node caching system 106 includes the access control rights information manager 126. In various implementations, the access control rights information manager 126 facilitates generating, sharing, receiving, compiling, and/or otherwise managing access control rights information. For example, after a traversed node responds to a graph query from a target node, where the graph query focuses on a particular user identifier (or another specific identifier indicated in the graph query), the access control rights information manager 126 sends access control rights information for all identifiers to the target node. In one or more implementations, the access control rights information is sent as a separate, often background, message to not interrupt or interfere with other services occurring at the target node, such as responding to the graph query. Additionally, as further described below, the access control rights information manager 126 determines whether to send the access control rights information from the traversed node to the target node.

As shown, the node caching system 106 includes the storage manager 128. In various implementations, the storage manager 128 can include any data used by any of the components of the node caching system 106 and/or the graph query system 114 in performing the features and functionality described herein.

Figure 2A:
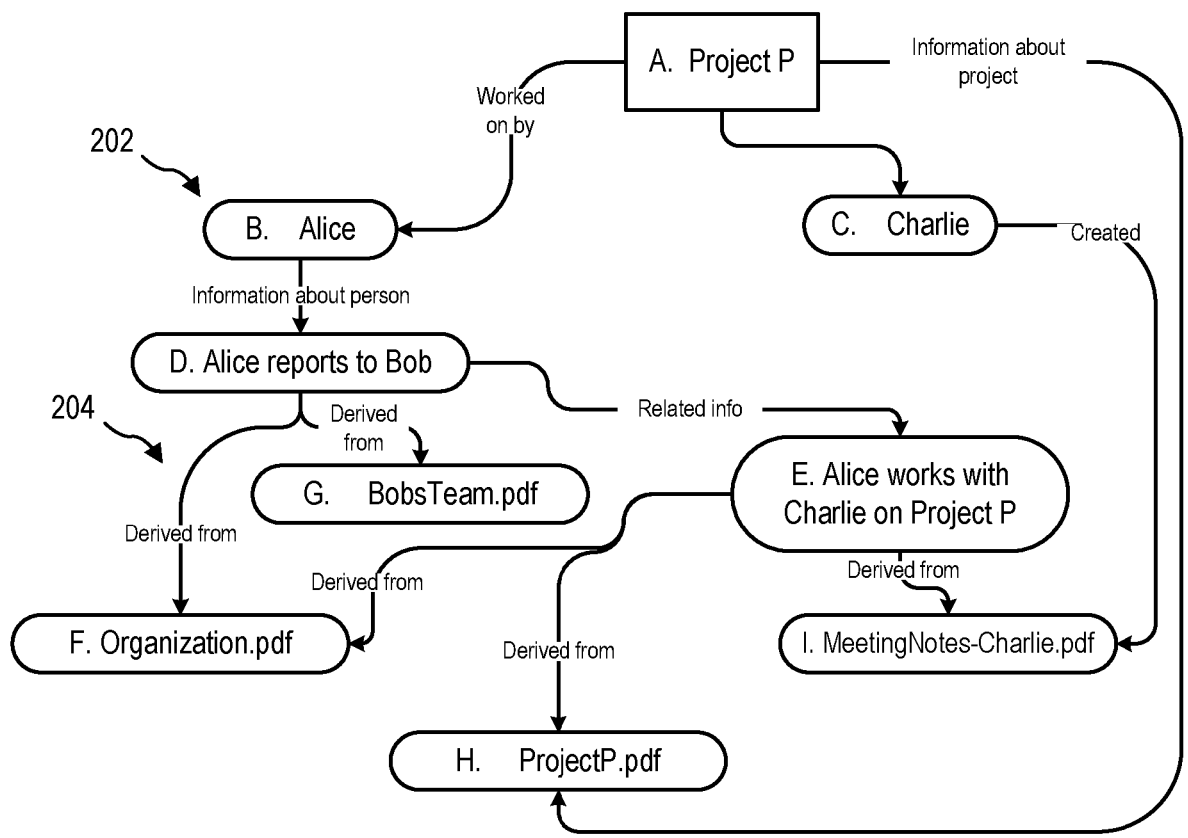
FIGS. 2A-2B illustrate examples of a knowledge graph in accordance with one or more implementations.
Figure 2B:
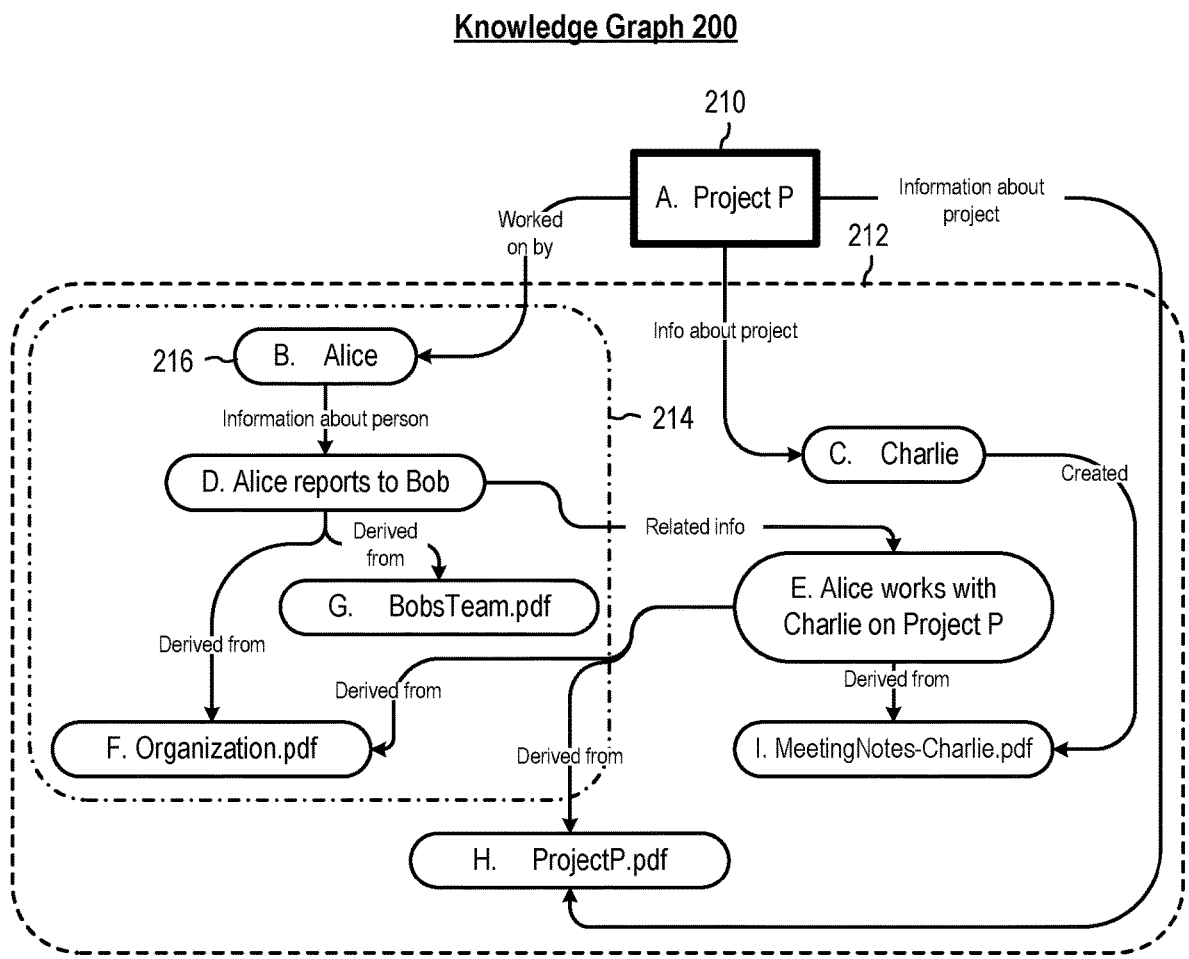

Turning to the next figures, FIGS. 2A-2B illustrate examples of a knowledge graph 200 in accordance with one or more implementations. As shown, the knowledge graph 200 includes nodes 202 and edges 204. As mentioned above, the nodes 202 represent resources and the edges 204 represent relationships between the nodes 202. Additionally, the nodes 202 are labeled with letters for convenience and explanation.

In the example shown in FIGS. 2A-2B, the knowledge graph 200 corresponds to a team of users working on a project. In particular, FIGS. 2A-2B show Alice, Bob, and Charlie working on Project P. The knowledge graph 200 also includes documents associated with Project P. The knowledge graph 200 in FIGS. 2A-2B serves as only an example fraction of a larger knowledge graph for an enterprise or company.

As mentioned above, the nodes 202 in the knowledge graph 200 correspond to resources including users, documents, and relevant information. In some implementations, a node includes information derived from other nodes, such as Node D, which indicates that Alice reports the Bob, which was derived from Node G. Additionally, the edges 204 indicates how nodes relate to other nodes. For simplicity, only a few edges are included between the nodes 202. However, the knowledge graph 200 can include additional edges between nodes and multiple edges between the same nodes.

As shown in FIG. 2B, Node A representing Project P has been selected as a target node 210. For example, in response to a graph query that includes a user identifier, the graph query system and/or node caching system designates Node A as a target node 210. To illustrate, the node graph system determines a candidate set of nodes that satisfies one or more criteria of the graph query, which can include the nodes shown in the knowledge graph 200. The node graph system then selects Node A as the target node 210.

Additionally, FIG. 2B shows traversed nodes 212 of the target node 210. To illustrate, when Node A is assigned as a target node in response to the average graph query, the node caching system regularly traverses the knowledge graph 200 to each of the nodes shown in the nodes 202. In other words, the traversed nodes 212 are nodes that are likely involved when a graph query identifies the target node 210 as relevant.

Further, FIG. 2B shows a traversed node subset 214. In some implementations, the traversed node subset 214 represents a results set or the nodes that are analyzed and/or returned by the query. For example, the if the graph query was for Alice's role on Project P (or resources associated with Alice), the node caching system assigns Project P as the target node 210, then searches the traversed nodes 212 of Project P to find Node B 216 associated with Alice. The node graph system then returns the corresponding nodes that answer the graph query (e.g., Nodes B, D, G, and F).

In some implementations, the traversed node subset 214 corresponds to the subset of traversed nodes 212 that the node caching system 106 includes in an access control cache for the target node 210. While the traversed node subset 214 is shown as a grouping, the subset of traversed nodes in the access control cache of the target node 210 can be further dispersed (e.g., the subset includes Nodes B, E, G, and H). Additionally, as described below, the node caching system 106 dynamically updates the access control cache, which can include adding new nodes as entries and removing stale entries.

FIG. 3 illustrates an example of an access control cache for a node in a knowledge graph in accordance with one or more implementations. In particular, FIG. 3 shows an access control cache 300 for the target node 210 in the knowledge graph 200 shown in FIGS. 2A-2B. As shown, the access control cache 300 includes an access control table 310 and a reference table 320. In some implementations, an access control cache does not include a reference table, or the reference table is located outside of the access control cache. For example, each computing device includes a global reference table for each access control cache stored on the device or includes a reference table for multiple target nodes.

As shown, the access control table 310 includes entries 302 (i.e., access control rights entries) that correspond to traversed nodes of a target node. In particular, the entries 302 map to a subset of traversed nodes. To illustrate, the entries 302 in FIG. 3 match the traversed node subset 214 shown in FIG. 2B.

As also shown, the entries 302 include a key 312, a value 314, and a timestamp 316. In various implementations, the key 312 corresponds to a given traversed node. For example, the key 312 includes a node identifier for the given traversed node. As shown, the keys initially include Nodes B, D, F, and G. Node I, shown below the dashed line, can be ignored for now but will be discussed below.

Additionally, the value 314 corresponds to the access control rights of the given traversed node. For instance, the value 314 includes the user identifiers of the user identifiers allowed (or not allowed) to access the given traversed node. To illustrate, the value for Node B indicates that Alice, Bob, and Charlie have access control rights and the value for Node D indicates Alice and Bob, but not Charlie, have access control rights.

In some instances, the value 314 includes group identifiers (or system identifiers). For example, Node F shows "Bob's Team" having access control rights. Utilizing the reference table 320, which maps a pointer or a short-from identifier 322 to a long-form identifier 324, the node caching system 106 determines that the value of "Bob's Team" for Node F includes user identifiers for Alice, Bob, Charlie, Daisy, and Eva. By using the reference table 320, the node caching system 106 saves memory when populating the access control table 310, and these benefits compound each time a previously used reference is further added to the access control table 310. Additionally, in some implementations, the access control cache 300 utilizes other data compression approaches and/or probabilistic approaches (e.g., Bloom filters) to reduce the amount of duplicative data stored in the access control cache 300.

As shown, the access control table 310 includes the timestamp 316, which indicates when an entry for a given traversed node was last updated. The timestamp 316 can correspond to another event time, such as the last graph query for a given traversed node. Similarly, the access control table 310 can include additional fields (e.g., columns), such as the last graph query for a given traversed node or the number of graph queries with a time period (e.g., one hour, day, month, etc.)

In various implementations, the node caching system 106 utilizes the timestamp 316 to purge stale entries from the access control table 310. For example, the node caching system 106 removes an entry from the access control table 310 when the timestamp 316 of the given traversed node is over a staleness threshold, as further described below in connection with FIG. 7.

As mentioned above, in many implementations, the node caching system 106 maintains the access control cache 300 for only a subset of traversed node for a target node 210. For example, the node caching system 106 only allows a predetermined number, size, or percentage of entries for traversed nodes. In one or more implementations, the number of traversed nodes is based on recent graph query activity. In these implementations, it is possible that all traversed nodes of a target node are included in the access control cache 300. However, more commonly, the access control cache 300 includes fewer than all of the traversed nodes of a target node.

The node caching system 106 also dynamically maintains the access control cache 300. To illustrate, based on a new graph query verifying access control rights of a user identifier for Node I (e.g., the newly added traversed node 304 at Time 5) with the target node 210, the node caching system 106 sends access control rights information to the target node 210. In response, the node caching system 106 receives the access control rights information and adds a new entry to the access control table 310, as shown below the dashed line. Additionally, as provided in the examples below, the node caching system 106 can remove and/or otherwise dynamically maintain entries in the access control cache 300.

In some implementations, an access control cache is associated with multiple target nodes on the same computing device. For example, nodes that are similar and/or located close to each other can share an access control cache. In these implementations, that node caching system 106 can reduce computing costs and increase computer efficiency by sharing and/or reusing the same access control cache for multiple nodes.

Turning to the next set of figures, FIGS. 4A-4B and FIGS. 5-7 correspond to various actions performed by the node caching system 106 to generate, refresh, update, and purge an access control cache of a target node. In addition, these figures correspond to the node caching system 106 and/or the node caching system utilizes an access control cache of a traversed node to verify the access of a user identifier for a given traversed node.

Figure 4A:
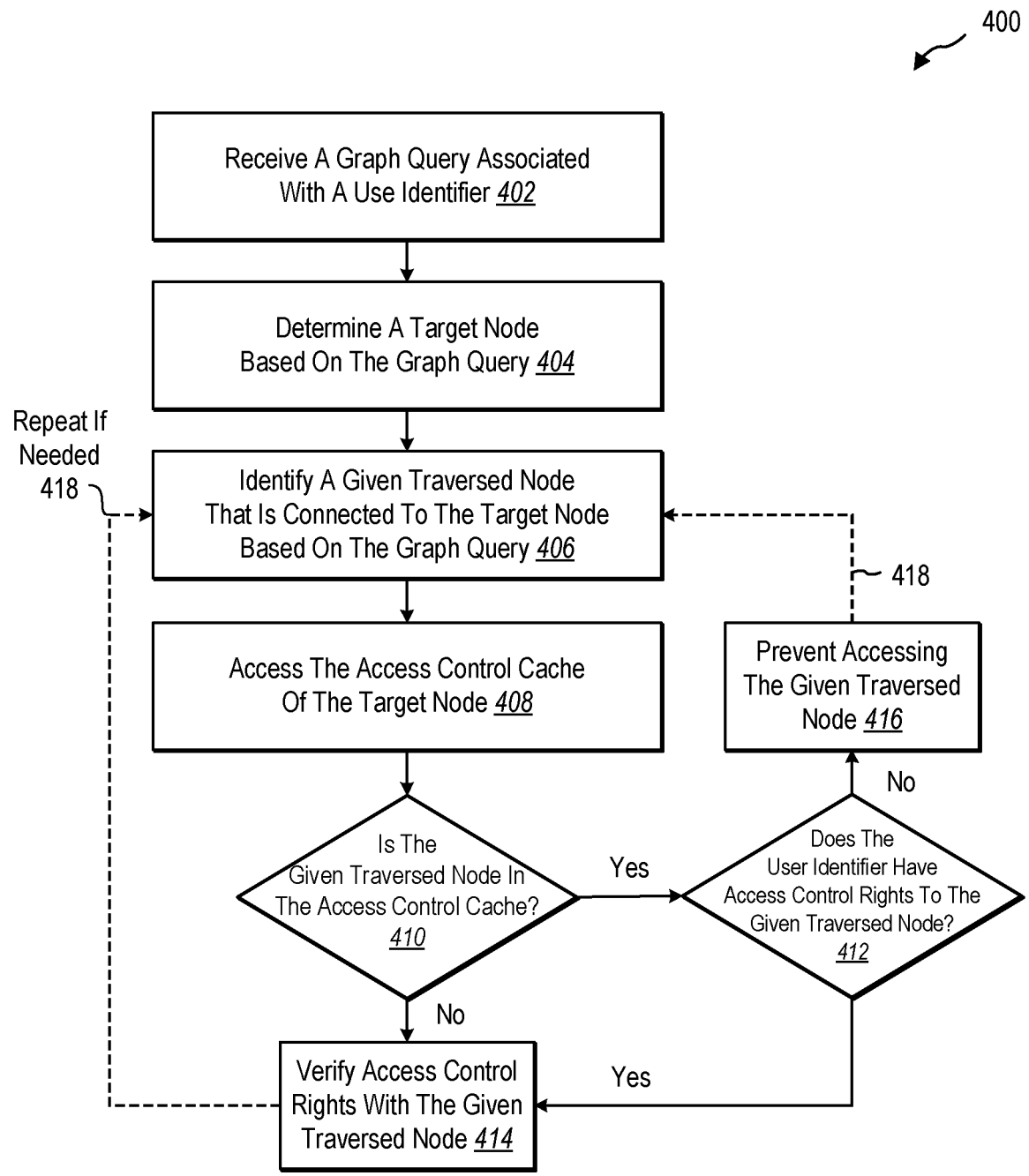
FIGS. 4A-4B illustrate example flow diagrams of verifying access control rights of a user identifier with a node in a knowledge graph utilizing an access control cache in accordance with one or more implementations.
Figure 4B:
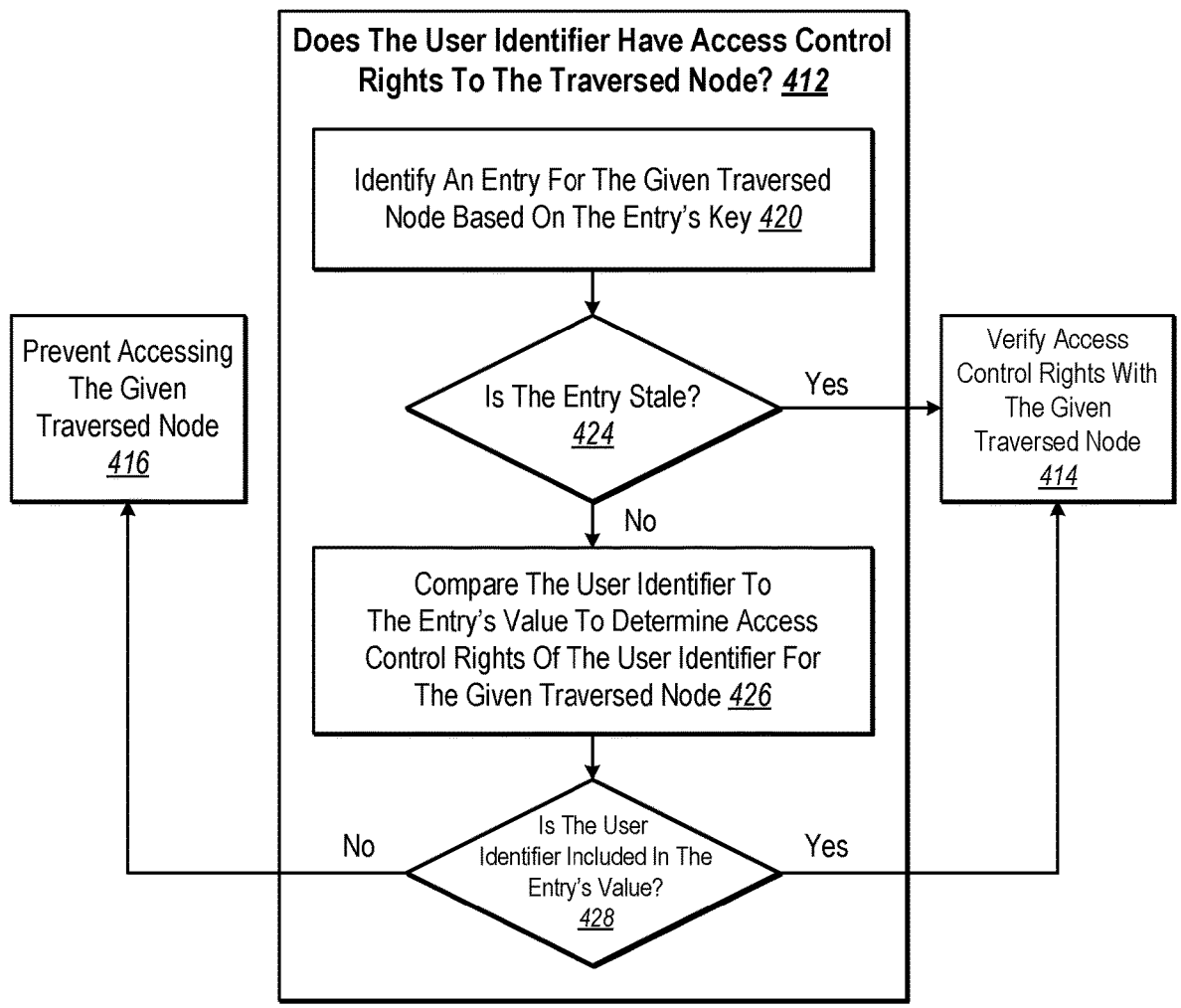

To illustrate, FIGS. 4A-4B show example flow diagrams of verifying access control rights of a user identifier with a node in a knowledge graph utilizing an access control cache in accordance with one or more implementations. As shown, FIG. 4A includes a series of acts 400 for verifying the access control rights of a traversed node. In various implementations, the node caching system 106 and the node caching system works in conjunction to perform the series of acts 400.

As shown, the series of acts 400 includes an act 402 of receiving a graph query associated with a user identifier. For example, the node caching system receives a graph query from a user client device for the information included in a knowledge graph. In response, the node caching system identifies a user identifier from the graph query along with one or more search criteria. In some implementations, the node caching system determines one or more search criteria from the graph query.

Additionally, the series of acts 400 includes an act 404 of determining a target node based on the graph query. For example, the node caching system and/or the node caching system 106 determines a set of candidate nodes in a knowledge graph that correspond to the graph query. Additionally, the node caching system and/or the node caching system 106 may determine a traversed node from the set of candidate nodes based on one or more factors, such as the number of edges, number of nodes within n number of node hops, and/or nodes that are frequently queried or searched.

As shown, the series of acts 400 includes an act 406 of identifying, based on the graph query, a given traversed node that is connected to the target node. In various implementations, the given traversed node is directly connected to the target node (e.g., one node hop away). In some implementations, the given traversed node is indirectly connected to the traversed node (e.g., multiple node hops away). In these latter implementations, the given traversed node may be located multiple network hops away from the target node but still belong to the set of candidate nodes. In some implementations, the given traversed node is located within a predetermined number of node hops from the target node (e.g., within three or five hops) but does not have to be part of the initially determined set of candidate nodes of the target node.

As also shown, the series of acts 400 includes an act 408 of accessing the access control cache of the target node. For instance, upon determining a traversed node based on the graph query (e.g., the given traversed node), the node caching system needs to determine the access control rights of the user identifier in the graph query for the given traversed node. In many implementations, the node caching system utilizes the access control cache of the target node maintained by the node caching system 106. Accordingly, after identifying the given traversed node, the node caching system accesses the access control cache of the target node.

As FIG. 4A shows, the series of acts 400 includes an act 410 of determining whether the given traversed node is in the access control cache of the target node. For example, the node caching system 106 compares the node with entries in the access control cache to determine whether the given traversed node is located in the access control cache. A detailed description of this action is described in connection with FIG. 4B below.

If an entry for the given traversed node is not located in the access control cache of the target node, the node caching system 106 indicates such to the node caching system. In response, the node caching system verifies access control rights with the given traversed node, as shown as the act 414 of the series of acts 400 (e.g., branching off from the "no" response of the act 410). As mentioned above, the access control cache commonly includes a subset of the traversed nodes for a target node. Accordingly, one or more traversed nodes of the target node will often be missing from the access control cache.

If, however, the given traversed node is included in the access control cache (e.g., the "yes" response of the act 410), the node caching system 106 performs additional actions. For example, the node caching system 106 performs the act 412 of determining whether the user identifier has access control rights to the given traversed node. A detailed description of this action is described in connection with FIG. 4B below.

If the user identifier is not granted access, the node caching system 106 prevents the node graph system from accessing the given traversed node, as shown in the act 416 of the series of acts 400 (e.g., a "no" response of the act 412). For example, the node caching system 106 instructs the node caching system to omit verifying access control rights and/or accessing the given traversed node because the verification request and/or access will be denied. By preventing the node graph system from communicating with the given traversed node, the node caching system 106 improves efficiency by not utilizing computing resources on requests that will be denied.

If the user identifier is granted access (e.g., the "yes" response of the act 412), the node caching system 106 can instruct the node graph system to verify access control rights with the given traversed node. For example, the node caching system 106 indicates to the node graph system that the user identifier does have access control rights to the given traversed node and has the node graph system verify the rights for the user identifier. In some implementations, such as if the entry for the given traversed node is within a freshness threshold (e.g., the entry was updated within the past 5 mins, 30 mins, 2 hours, 1 day, etc.), the node graph system skips or omits performing an additional verification check with the given traversed node.

Upon determining whether a given traversed node has access control rights, the node graph system and/or the node caching system 106 can repeat acts 406-416 for additional traversed nodes. To illustrate, the series of acts 400 includes an act 418 of returning to the act 406 and repeating the remaining acts in the series of acts 400, if necessary, for additional traversed nodes of the target node. Further, in some instances, traversed nodes are themselves key nodes and may include their own access control cache (or share a common access control cache). In these implementations, the above process of using an access control cache to determine access control rights of additional traversed nodes of the traversed node can be repeated with the traversed node.

As mentioned above, FIG. 4B expounds on the act 412 of determining whether the user identifier has access control rights to the given traversed node performed by the node caching system 106. As shown, the act 412 includes a sub-act 420 of identifying an entry for the given traverse node based on the entry key. In various implementations, the node caching system 106 compares a node identifier of the node with the keys of an access control table to determine if the node includes an entry in the access control cache (e.g., based on finding a node identifier/key match).

Additionally, the act 412 includes a sub-act 424 of determining whether the entry is stale. Additional details regarding determining whether a given entry is stale are described further below in connection with FIG. 7. If the entry is stale, the node caching system 106 proceeds to the act 414 of verifying access control rights with the given traverse node. Furthermore, in some implementations, the node caching system 106 skips or omits this sub-act 424.

If the node caching system 106 determines that the entry is not stale, the node caching system 106 proceeds to the sub-act 426 of comparing the user identifier to the entry value to determine access control rights after the user identifier for the given traverse node. For instance, the node caching system 106 compares the user identifier to the value of the given traversed node's entry in the access control cache to determine if a match is present.

As shown, the act 412 includes a sub-act 428 of determining whether the user identifier is included in the entry's value. If the value of the entry corresponding to the given traversed node is in the access control cache of the target node includes the user identifier, the node caching system 106 determines that the user has access control rights to the given traversed node. In these cases, the node caching system 106 and/or the node graph system performs the act 414 of verifying access control rights with the given traverse node.

Otherwise, if the user identifier is not directly or indirectly included in the entry's value, the node caching system 106 determines that the access control rights information for the given traversed node in the access control cache does not indicate access control rights for the user identifier. In these instances, the node caching system 106 and/or the node graph system performs the act 416 of preventing the node graph system from accessing the given traversed node, which is previously described.

Figure 5:
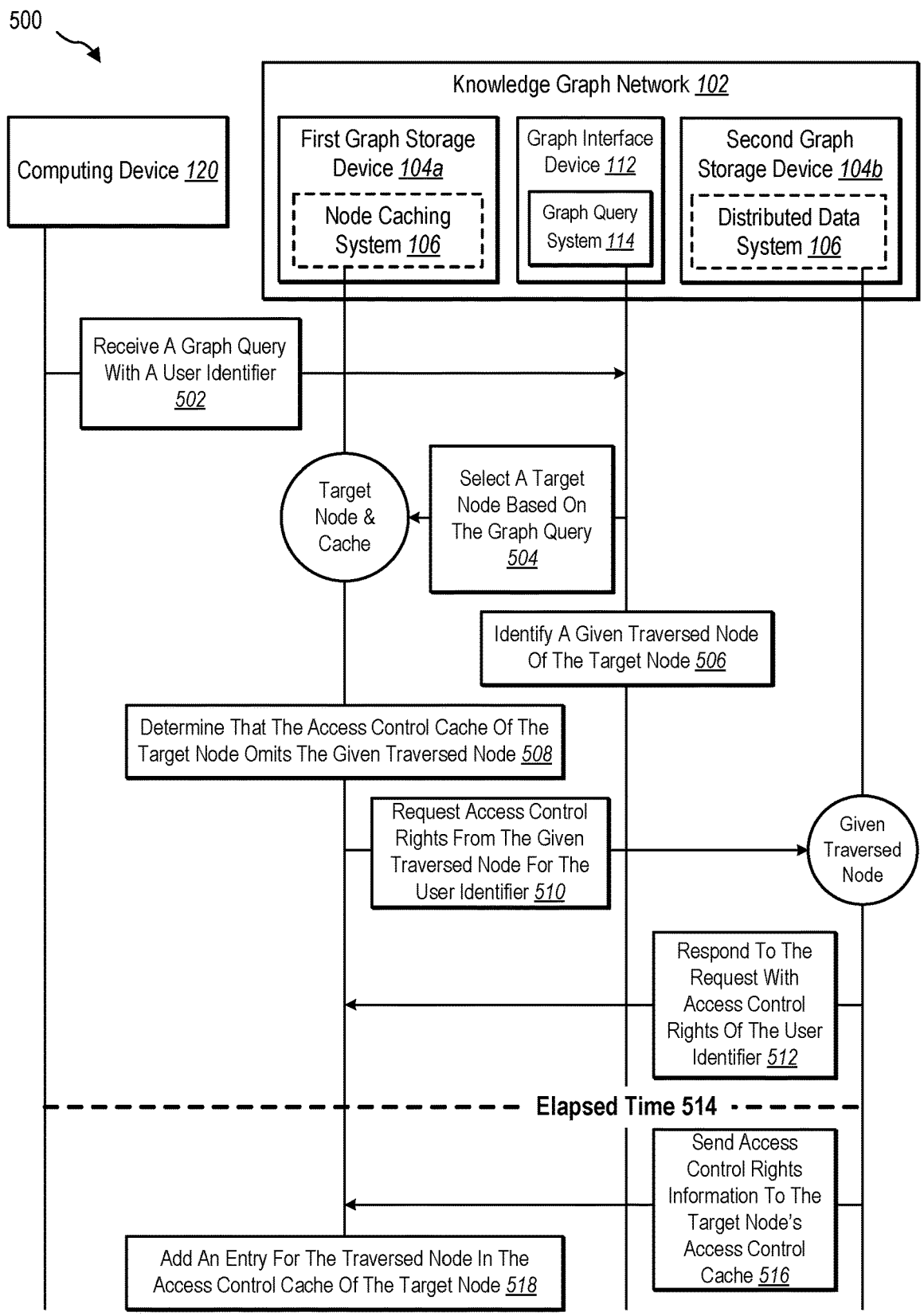
FIG. 5 illustrates an example sequence diagram of building an access control cache of a target node in accordance with one or more implementations.

FIG. 5 illustrates an example sequence diagram of building an access control cache of a target node in accordance with one or more implementations. For example, not all nodes in a knowledge graph may have a corresponding access control cache. Over time, based on graph query patterns, some nodes may gain an access control cache while other nodes lose their access control cache. Indeed, the node caching system 106 can dynamically maintain access control caches for nodes of the knowledge graph when the nodes are often selected as target nodes for graph queries. In this manner, the node caching system 106 amortizes the access control cache based on the different graph queries to the target node.

As shown, FIG. 5 includes the computing device 120 and the knowledge graph network 102 introduced above in connection with FIG. 1A. Additionally, the knowledge graph network 102 in FIG. 5 includes the first graph storage device 104a having the node caching system 106, the graph interface device 112 having the graph query system 114, and the second graph storage device 104b having the node caching system 106 (e.g., another instance or portion of the node caching system). As also shown, FIG. 5 includes a series of acts 500 for generating an access control cache of a key node (e.g., a target node).

As shown, the series of acts 500 includes an act 502 of receiving a graph query with a user identifier. In particular, the graph query system 114 within graph interface device 112 receives the graph query from the computing device 120 (e.g., a user client device) that includes the user identifier of the user making the request, as described above.

As also shown, the series of acts 500 includes an act 504 of the graph query system 114 selecting a target node based on the graph query. As described above, in various implementations, the graph query system 114 determines a set of candidate nodes based on the graph query as well as selects a target node from the set of candidate nodes. In many implementations, the node caching system 106 generates (at initializes) an access control cache in connection with the target node. Accordingly, as shown, FIG. 5 shows the target node and cache as part of the first graph storage device 104a.

Additionally, the series of acts 500 includes an act 506 of identifying a given traversed node of the target node, as described above.

The series of acts 500 includes an act 508 of the node caching system 106 determining that the access control cache of the target node omits the given traversed node. For example, the node caching system 106 may initially be creating the access control cache for the target node, or the access control cache may be in the early stages of being built. As a result, the given traversed node is not included in the access control cache. In some implementations, the access control cache may include several entries but not include an entry for the given traversed node as the access control cache only includes a subset of the traversed nodes of the target node.

As shown, the series of acts 500 includes an act 510 of requesting access control rights from the given traversed node for the user identifier. For example, because the given traversed node is not in the access control cache of the target node, the node caching system 106 and/or the graph query system 114 sends a request to the given traversed node to determine whether the user identifier has access control rights. For instance, a portion of the node caching system (e.g., a query executor) on the first graph storage device 104*a* sends the request to the given traversed node on the second graph storage device 104*b*.

In response, the given traversed node responds to the request with access control rights of the user identifier, as shown in the act 512 of the series of acts 500. For example, a portion of the graph query system 114 on the second graph storage device 104*b* responds to the request from the target node on the first graph storage device 104*a*.

Additionally, FIG. 5 also includes an elapsed time 514. In some implementations, the elapsed time 514 is a brief pause. In various implementations, the elapsed time 514 is a longer period of time. In any case, the elapsed time 514 represents that the act 516 of the series of acts 500 occurs after the act 512 such that the act 516 is separate and independent from the act 512. In certain implementations, the elapsed time 514 waits for a period of downtime in the node caching system 106. However, in a few implementations, the act 516 occurs at the same time (e.g., concurrent with), or as part of (e.g., within the same response), the act 512.

As shown, after the elapsed time 514, the series of acts 500 includes an act 516 of the given traversed node sending access control rights information to the access control cache of the target node. For example, the node caching system 106 on the second graph storage device 104*b* generates and sends a message that includes access control rights information of the given traversed node for all identifiers (e.g., user identifiers, device identifiers, system identifiers). In response, the node caching system 106 on the first graph storage device 104*a* receives the access control rights information and adds an entry for the traversed node in the access control cache of the target node, as shown in the act 518 of the series of acts 500. Accordingly, the updated access control cache includes an entry for the given traversed node.

As provided above, in various implementations, a verification request to the given traversed node for access control rights of any identifier will trigger, often in a separate message so as not to interrupt the graph query, the access control rights information of the given traversed node to be sent to the target node. Thus, based on traversed nodes that are frequently queried and/or requested by the target node will provide their access control rights information to the target node and other traversed nodes that are not queried will not send their access control rights information to the target node (which will needlessly encumber the access control cache with entries that are not likely to be utilized).

While FIG. 5 provides some approaches for curating an access control cache, the node caching system 106 may utilize other approaches. For example, the node caching system 106 generates an access control cache for a target node when the target node has at least x number of connections. In some cases, the node caching system 106 generates an access control cache for nodes of a particular type or containing specific content types.

Figure 6:
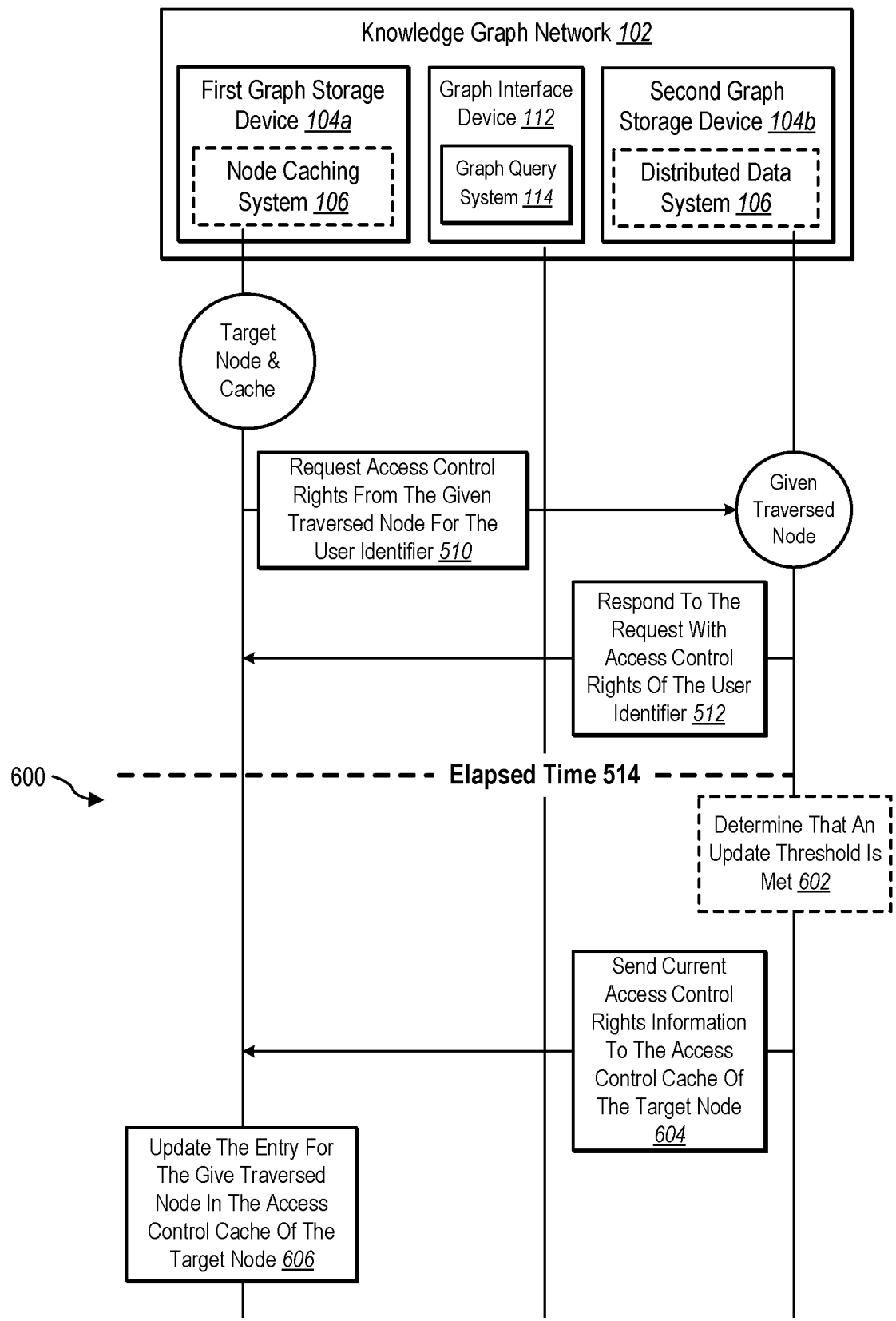
FIG. 6 illustrates an example sequence diagram of dynamically updating an access control cache of a target node in accordance with one or more implementations.

FIG. 6 illustrates an example sequence diagram of dynamically updating an access control cache of a target node in accordance with one or more implementations. For example, the node caching system 106 automatically updates the access control cache of target nodes based on graph query behavior patterns of graph query that involve the traversed node. In this manner, the access control cache of a traversed node includes entries for traversed nodes that are relevant and currently being searched while less relevant and/or outdated traversed nodes are omitted or removed from the access control cache.

FIG. 6 includes the same components as FIG. 5 (with the exception of the computing device 120 being hidden). For example, the target node, access control cache, and given traversed node in FIG. 6 are the components introduced above in FIG. 5. Additionally, FIG. 6 includes the act 510 of requesting access control rights from the given traversed node for the user identifier and the act 512 of responding to the request for access control rights of the user identifier, which are both described above. FIG. 6 also includes the elapsed time 514 described in FIG. 5.

FIG. 6 also includes a series of acts 600 for dynamically updating the access control cache of a target node. As shown, the series of acts 600 begins after the elapsed time 514. To provide context, the series of acts 600 is triggered in response to the given traversed node receiving a request for access control rights for an identifier (e.g., a user identifier). When an access control cache of a target node does not include access control rights information for the traversed node, has stale access control rights information for the traversed node, or indicates that the identifier has access rights to the traversed node (but not when the access control cache indicates no access to the traversed node). In this manner, traversed nodes that are actively called will provide and populate access control caches.

In particular, the series of acts 600 includes an act 602 of the node caching system 106 on the second graph storage device 104*b* determining that an update threshold is met. For example, the node caching system 106 determines when the last access control rights information message was sent from the given traversed node to the target node. If the messages were sent within an update threshold (e.g., 5 minutes, 1 hour, 1 day, etc.), then the node caching system 106 does not resend the access control rights information from the given traversed node to the traversed node (unless the access control rights information has changed since the last message). In this manner, the node caching system 106 saves processing and bandwidth resources by reducing redundant messages that do not add value to the access control cache of the target node.

In some implementations, the act 602 includes identifying when the entry for the given traversed node was last updated in the access control cache of the target node. For example, the last update timestamp for the entry is provided in the previously received request (e.g., as part of the act 512). In these examples, the node caching system 106 determines if the time between the last update and the current time exceeds the update threshold.

In various implementations, the act 602 is optional and the node caching system 106 proceeds to act 604. As shown, the act 604 of the series of acts 600 includes the node caching system 106 on the second graph storage device 104b sending current access control rights information to the access control cache of the target node. As noted above, the node caching system 106 sends the access control rights information for all identifiers that have the right to access the given traversed node (or are denied access control rights) in a message to the target node.

As shown, the series of acts 600 includes the act 606 of the node caching system 106 on the first graph storage device 104a updating the entry for the given traversed node in the access control cache of the target node. For example, the node caching system 106 adds an entry if a previous entry for the traversed node has been removed. In some implementations, the node caching system 106 updates or overwrites an existing entry in the access control cache for the given traversed node if any of the access control rights information has changed.

To share an example of how dynamic updates by the node caching system 106 provide benefit, consider a new user identifier that recently granted access to a given traversed node. Initially, the node caching system 106 will indicate that the new user does not have access control rights to the given target node in response to a graph query from the new user identifier. However, as other graph queries are received that involve the given traverse node, the given traversed node will provide updated access control rights information to include in the access control cache. Then, if the new identifier requests access, the access control cache with include the new user identifier as having access to the traversed node.

Alternatively, rather than other graph queries trigging the access control rights information being updated in the access control cache, the entry for the given traversed node may be removed after becoming stale. Here, when the new identifier requests access, because there is no entry in the access control cache for the given traversed node, the node caching system 106 will trigger an access control rights request to the given traversed node for the new user identifier. The given traversed node will respond to the request granting access to the new user identifier. Additionally, the given traversed node will provide updated access control rights information to the access control cache to be included in the access control cache, as noted above.

Figure 7:
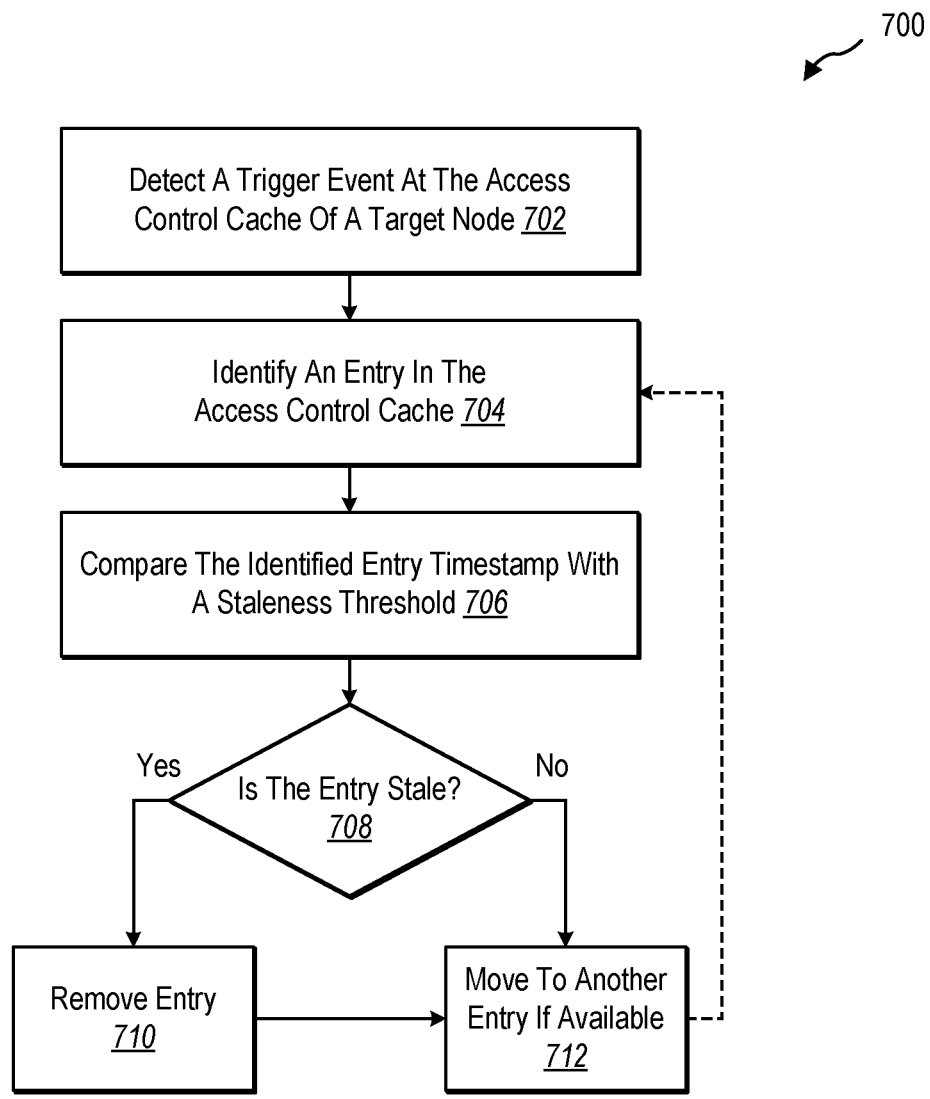
FIG. 7 illustrates an example flow diagram of dynamically removing stale entries from an access control cache of a target node in accordance with one or more implementations.

FIG. 7 illustrates an example flow diagram of dynamically removing stale entries from an access control cache of a target node in accordance with one or more implementations. As noted above, the node caching system 106 dynamically maintains access control caches of target nodes. Additionally, access control caches commonly include only a subset of their traversed nodes. Further, because the behavior patterns of graph queries change over time, traversed nodes that are relevant at one time (e.g., nodes corresponding to Project A) will become less relevant and other traversed nodes may become more relevant (e.g., nodes corresponding to Project Z).

To illustrate, FIG. 7 includes a series of acts 700 for removing outdated (aka stale) entries from an access control cache. As shown, the series of acts 700 includes an act 702 of detecting a trigger event at the access control cache of a target node. For example, in one or more implementations, the node caching system 106 performs the series of acts 700 when a new graph query involves the target node. In some implementations, the series of acts 700 initiates on a schedule. In some implementations, the series of acts 700 initiates when the access control cache meets a size limit threshold based on the data size of the access control cache or the number of entries. In any case, based on some trigger, the node caching system 106 initiates the series of acts 700.

As shown, the series of acts 700 includes an act 704 of identifying an entry in the access control cache. For example, node caching system 106 systematically selects the first entry in the access control cache. As another example, the node caching system 106 identifies and selects the oldest entry in the access control cache. In some implementations, the node caching system 106 randomly selects an entry.

In addition, the series of acts 700 includes an act 706 of comparing the identified entry timestamp with a staleness threshold and determining if the entry is stale, as shown in the act 708. For example, in one or more implementations, the node caching system 106 compares the timestamp of the entry, which likely corresponds to the time the entry was last updated, to the current time to determine if the node caching system 106 duration of time exceeds a staleness threshold. Stated differently, the node caching system 106 determines whether the entry is stale based on if the entry has been updated more recently than a staleness threshold. For instance, if the staleness threshold is one week, the node caching system 106 determines if the entry was updated within the last week or if the last update was older than one week.

If the entry is stale, then the node caching system 106 removes the entry, as shown in the act 710 of the series of acts 700. Indeed, in many implementations, the node caching system 106 purges the stale entry from the access control cache as the given traversed node is not being accessed by recent graph queries. Then, the node caching system 106 moves to another entry (to determine staleness) if available, as shown in the act 712 if the series of acts 700.

Additionally, if the node caching system 106 determines that the entry is not stale, the node caching system 106 moves to another entry in the access control cache. As shown, the node caching system 106 moves to another entry (to determine staleness), if available, which includes returning to the act 704 and repeating acts 704-712 until the node caching system 106 has removed all stale entries in the access control cache.

Figure 8:
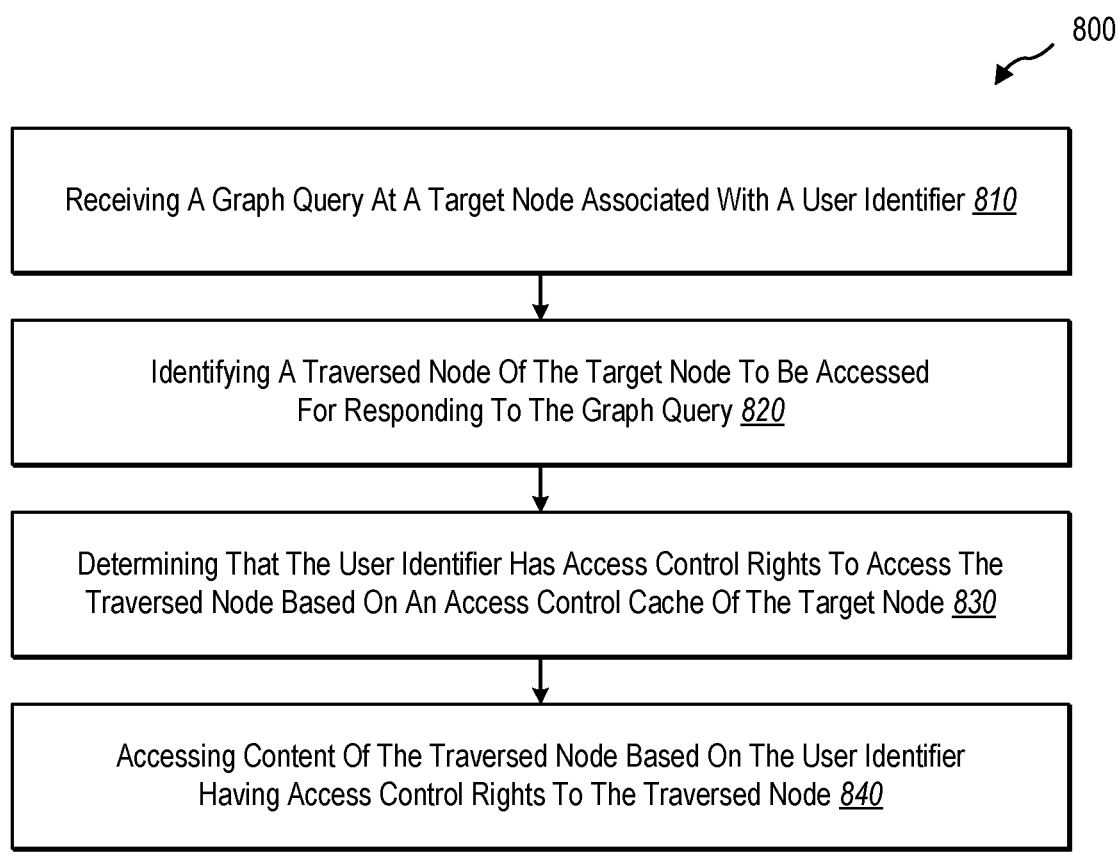
FIG. 8 illustrates an example series of acts of determining access control rights of nodes in a knowledge graph for user identifiers in accordance with one or more implementations.

Turning now to FIG. 8, this figure illustrates example flowcharts including a series of acts 800 of dynamically removing stale entries from an access control cache of a target node in accordance with one or more implementations. While FIG. 8 illustrates acts according to one or more implementations, alternative implementations may omit, add to, reorder, and/or modify any of the acts shown. Further, the acts of FIG. 8 can be performed as part of a method. Alternatively, a non-transitory computer-readable medium can include instructions that, when executed by one or more processors, cause a computing device to perform the acts of FIG. 8. In still further implementations, a system can perform the acts of FIG. 8.

As shown, the series of acts 800 includes an act 810 of receiving a graph query at a target node associated with a user identifier. For instance, the act 810 may include receiving, at a target node associated with a knowledge graph that includes nodes connected via edges, a graph query associated with a user identifier.

As further shown, the series of acts 800 includes an act 820 of identifying a traversed node of the target node to be accessed for responding to the graph query. For example, the act 820 may involve identifying a traversed node to be accessed for responding to the graph query where the traversed node is connected to the target node based on the graph query.

As further shown, the series of acts 800 includes an act 830 of determining that the user identifier has access control rights to access the traversed node based on an access control cache of the target node. For example, the act 830 may include determining that the user identifier has access control rights to access the traversed node based on an access control rights entry for the traversed node in an access control cache associated with the target node.

As further shown, the series of acts 800 includes an act 840 of accessing the content of the traversed node based on the user identifier having access control rights to the traversed node. For example, the act 840 may involve accessing the content of the traversed node in connection with responding to the graph query based on identifying from the access control cache that the user identifier has access control rights.

In addition, the series of acts 800 includes one or more additional acts. For example, the series of acts 800 includes verifying the access control rights of the user identifier with the traversed node before accessing the content of the traversed node. In some implementations, the series of acts 800 includes receiving access control rights information from the traversed node in a separate communication not associated with the graph query after verifying the access control rights of the user identifier with the traversed node in connection with the graph query and updating the access control cache with the access control rights information. In various implementations, the access control rights information includes one or more user identifiers or one or more group identifiers that have access to the traversed node and timestamp information. In some instances, the access control rights information includes one or more user identifiers or one or more group identifiers that have access to the traversed node and timestamp information.

In one or more implementations, the access control cache associated with the target node includes a key-value table having access control rights entries for a subset of traversed nodes connected to the target node. In various implementations, each of the access control rights entries includes a key corresponding to a given traversed node of the subset of traversed nodes connected to the target node, a value corresponding to the given traversed node indicating one or more user identifiers or group identifiers having access to the given traversed node, and a timestamp indicating an update time of an access control rights entry for the given traversed node.

Additionally, in some implementations, the access control cache associated with the target node further includes a reference table that maps user identifiers or group identifiers to short-form identifiers, a value for the access control rights entry of the traversed node includes a first short-form identifier, and/or a value for an additional access control rights entry of an additional traversed node includes the first short-form identifier. Additionally, in certain implementations, determining that the user identifier has access control rights to access the traversed node includes identifying the access control rights entry for the traversed node in the access control cache based on a key matching the traversed node and comparing the user identifier with the value for the access control rights entry of the traversed node in the access control cache to determine that the user identifier has access control rights to the traversed node.

In one or more implementations, the series of acts 800 includes identifying an additional traversed node to be accessed for responding to the additional graph query based on receiving an additional graph query associated with the user identifier at an additional target node (where the additional traversed node being connected to the additional target node); identifying an additional access control rights entry for the additional traversed node in an additional access control cache associated with the additional target node; determining that the access control rights entry is stale based on a timestamp associated with the additional access control rights entry; and based on the additional access control rights entry for the additional traversed node being stale, verifying the access control rights of the user identifier with the additional traversed node.

In various implementations, the series of acts 800 includes determining that an additional access control rights entry for a given traversed node in the access control cache associated with the target node is stale based on comparing a timestamp in the access control rights entry to a staleness threshold and removing the additional access control rights entry for the given traversed node from the access control cache associated with the target node. In a number of implementations, the series of acts 800 includes removing the access control rights entry for the traversed node from the access control cache associated with the target node based on determining that the access control rights entry is stale.

In certain implementations, the series of acts 800 includes identifying an additional traversed node to be accessed for responding to the additional graph query based on receiving an additional graph query with the user identifier at an additional target node (where the additional traversed node being connected to the additional target node); determining that an additional access control cache associated with the additional target node does not include an access control rights entry for the additional traversed node; based on the additional access control cache associated with the additional target node omitting an access control rights entry for the additional traversed node, verifying the access control rights of the user identifier with the additional traversed node; after verifying the access control rights of the user identifier with the additional traversed node in connection with the additional graph query, receiving additional access control rights information from the additional traversed node, wherein the additional access control rights information is received in an additional separate communication not associated with the additional graph query; and adding an access control rights entry for the additional traversed node to the additional access control cache of the additional traversed node that includes the additional access control rights information.

In some implementations, the target node is located on a first computing or server device and the traversed node is located on a second computing or server device that is different from the first computing or server device. In additional implementations, the target node and the access control cache associated with the target node are both located on the first computing or server device. In one or more implementations, accessing the content from the traversed node comprises accessing data from the traversed node. In a number of implementations, the series of acts 800 includes updating a timestamp of the access control rights entry for the traversed node from the access control cache associated with the target node based on receiving access control rights information from the traversed node.

In various implementations, the series of acts 800 includes utilizing a knowledge graph that has nodes connected via edge connections including a target node, where the target node is connected to traversed nodes as well as an access control cache of a target node, and where the access control cache includes access control rights entries for a subset of traversed nodes that are connected to the target node. In these instances, series of acts 800 includes receiving, at the target node, a graph query associated with a user identifier; based on the graph query, identifying a traversed node of the traversed nodes to be accessed for responding to the graph query; determining that the user identifier has access control rights to access the traversed node based on an access control rights entry for the traversed node in the access control cache of the target node; and based on identifying from the access control cache that the user identifier has access control rights, verifying the access control rights of the user identifier with the traversed node before accessing the content of the traversed node.

In additional implementations, the series of acts 800 includes receiving, at the traversed node, a request to verify the access control rights of the user identifier with the traversed node and returning a response to the request indicating that the user identifier has access to the traversed node. In some implementations, the series of acts 800 includes providing, after sending the response to the request and in a background process, access control rights information to the access control cache associated with the target node for all user identifiers or user groups having access control rights to the traversed node.

In some implementations, the series of acts 800 includes receiving, at a second computing or server device that hosts the traversed node and that is different from a first computing or server device that hosts the traversed node, a request to verify the access control rights of the user identifier with the traversed node; returning a response to the request indicating that the user identifier has access to the traversed node; and determining, based on a request timestamp associated with the request being within an update threshold, not to send access control rights information for the traversed node to the access control cache associated with the target node.

In one or more implementations, the series of acts 800 includes receiving, at a target node associated with a knowledge graph including nodes connected via edges, a graph query associated with a user identifier; based on the graph query, identifying a traversed node to be accessed for responding to the graph query, the traversed node being connected to the target node; determining that the user identifier lacks access control rights to the traversed node based on an access control rights entry for the traversed node in an access control cache associated with the target node; and based on identifying that the user identifier lacks access control rights for the traversed node, preventing access to the traversed node in the knowledge graph with respect to the graph query.

In various implementations, the series of acts 800 also includes determining that the access control rights entry is stale; removing the access control rights entry for the traversed node from the access control cache associated with the target node; receiving, at the target node, an additional graph query associated with the user identifier; based on the additional graph query, identifying the traversed node to be accessed for responding to the additional graph query; and based on not identifying the access control rights entry for the traversed node in an access control cache associated with the target node, verifying the access control rights of the user identifier with the traversed node.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above should also be included within the scope of computer-readable media.

In addition, the network described herein may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the node caching system 106. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud-computing system.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by a processor, cause a general-purpose computer, special-purpose computer, or special-purpose processing device to perform a certain function or group of functions. In some implementations, computer-executable instructions are executed by a general-purpose computer to turn the general-purpose computer into a special-purpose computer implementing elements of the disclosure. The computer-executable instructions may include, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 9:
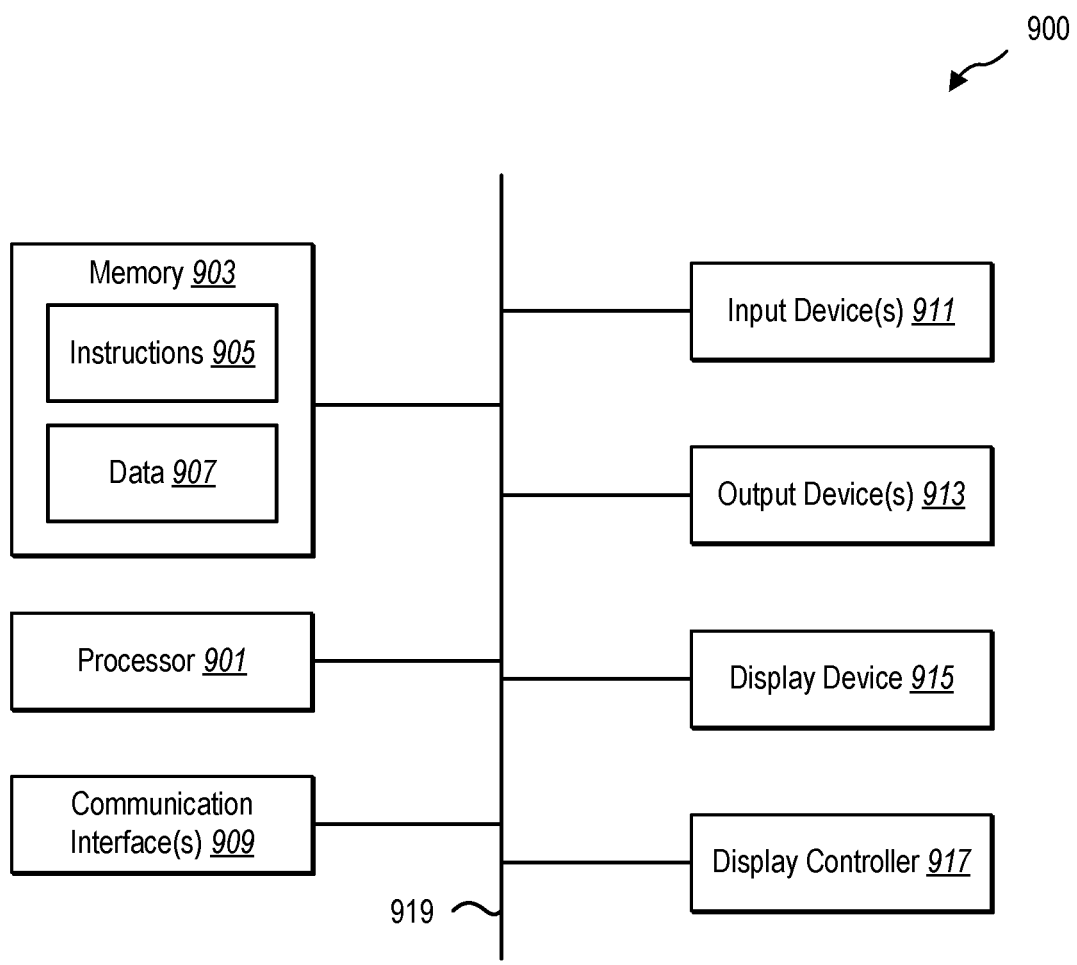
FIG. 9 illustrates example components that may be included within a computer system.

FIG. 9 illustrates certain components that may be included within a computer system 900. The computer system 900 may be used to implement the various computing devices, components, and systems described herein.

In various implementations, the computer system 900 may represent one or more of the client devices, server devices, or other computing devices described above. For example, the computer system 900 may refer to various types of network devices capable of accessing data on a network, a cloud-computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud-computing system), or another non-portable device.

The computer system 900 includes a processor 901. The processor 901 may be a general-purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 901 may be referred to as a central processing unit (CPU). Although the processor 901 shown is just a single processor in the computer system 900 of FIG. 9, in an alternative configuration, a combination of processors (e.g., an ARM and DSP) could be used.

The computer system 900 also includes memory 903 in electronic communication with the processor 901. The memory 903 may be any electronic component capable of storing electronic information. For example, the memory 903 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

The instructions 905 and the data 907 may be stored in the memory 903. The instructions 905 may be executable by the processor 901 to implement some or all of the functionality disclosed herein. Executing the instructions 905 may involve the use of the data 907 that is stored in the memory 903. Any of the various examples of modules and components described herein may be implemented, partially or wholly, as instructions 905 stored in memory 903 and executed by the processor 901. Any of the various examples of data described herein may be among the data 907 that is stored in memory 903 and used during the execution of the instructions 905 by the processor 901.

A computer system 900 may also include one or more communication interface(s) 909 for communicating with other electronic devices. The one or more communication interface(s) 909 may be based on wired communication technology, wireless communication technology, or both. Some examples of the one or more communication interface(s) 909 include a Universal Serial Bus (USB), an Ethernet adapter, a wireless adapter that operates in accordance with an Institute of Electrical and Electronics Engineers (IEEE) 902.11 wireless communication protocol, a Bluetooth® wireless communication adapter, and an infrared (IR) communication port.

A computer system 900 may also include one or more input device(s) 911 and one or more output device(s) 913. Some examples of the one or more input device(s) 911 include a keyboard, mouse, microphone, remote control device, button, joystick, trackball, touchpad, and light pen. Some examples of the one or more output device(s) 913 include a speaker and a printer. A specific type of output device that is typically included in a computer system 900 is a display device 915. The display device 915 used with implementations disclosed herein may utilize any suitable image projection technology, such as liquid crystal display (LCD), light-emitting diode (LED), gas plasma, electroluminescence, or the like. A display controller 917 may also be provided, for converting data 907 stored in the memory 903 into text, graphics, and/or moving images (as appropriate) shown on the display device 915.

The various components of the computer system 900 may be coupled together by one or more buses, which may include a power bus, a control signal bus, a status signal bus, a data bus, etc. For the sake of clarity, the various buses are illustrated in FIG. 9 as a bus system 919.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer-implemented method comprising:
    based on receiving a graph query that includes a graph request and a user identifier, determining a target node in a knowledge graph that corresponds to the graph query, the knowledge graph having nodes connected via edges;
    based on the target node not satisfying one or more criteria of the graph query, identifying a traversed node to be accessed for responding to the graph query, the traversed node being connected to the target node;
    determining that the user identifier has access control rights to access the traversed node based on accessing an access control cache of the target node, the access control cache of the target node having an access control rights entry for the traversed node; and
    based on identifying from the access control cache of the target node that the user identifier has access control rights for the traversed node, accessing content of the traversed node in connection with responding to the graph query.

2. The computer-implemented method of claim 1, further comprising verifying the access control rights of the user identifier with the traversed node before accessing the content of the traversed node.

3. The computer-implemented method of claim 2, further comprising:
    after verifying the access control rights of the user identifier with the traversed node in connection with the graph query, receiving access control rights information from the traversed node in a separate communication; and
    updating the access control cache with the access control rights information.

4. The computer-implemented method of claim 3, wherein the access control rights information comprises one or more user identifiers or one or more group identifiers that has access to the traversed node and timestamp information.

5. The computer-implemented method of claim 1, wherein the access control cache associated with the target node comprises a key-value table having access control rights entries for a subset of traversed nodes connected to the target node, wherein each of the access control rights entries includes:
    a key corresponding to a given traversed node of the subset of traversed nodes connected to the target node;
    a value corresponding to the given traversed node indicating one or more user identifiers having access to the given traversed node; and
    a timestamp indicating an update time of an access control rights entry for the given traversed node.

6. The computer-implemented method of claim 5, wherein:
    the access control cache associated with the target node further comprises a reference table that maps user identifiers to short-form identifiers;
    a value for the access control rights entry of the traversed node comprises a first short-form identifier; and
    a value for an additional access control rights entry of an additional traversed node comprises the first short-form identifier.

7. The computer-implemented method of claim 6, wherein determining that the user identifier has access control rights to access the traversed node comprises:
    identifying the access control rights entry for the traversed node in the access control cache based on a key matching the traversed node; and
    comparing the user identifier with the value for the access control rights entry of the traversed node in the access control cache to determine that the user identifier has access control rights to the traversed node.

8. The computer-implemented method of claim 1, further comprising:
    based on receiving an additional graph query associated with the user identifier at an additional target node, identifying an additional traversed node to be accessed for responding to the additional graph query, the additional traversed node being connected to the additional target node;
    identifying an additional access control rights entry for the additional traversed node in an additional access control cache associated with the additional target node;
    determining that the access control rights entry is stale based on a timestamp associated with the additional access control rights entry; and
    based on the additional access control rights entry for the additional traversed node being stale, verifying the access control rights of the user identifier with the additional traversed node.

9. The computer-implemented method of claim 1, further comprising:
    determining that an additional access control rights entry for a given traversed node in the access control cache associated with the target node is stale based on comparing a timestamp in the access control rights entry to a staleness threshold; and
    removing the additional access control rights entry for the given traversed node from the access control cache associated with the target node.

10. The computer-implemented method of claim 1, further comprising:
based on receiving an additional graph query with the user identifier at an additional target node, identifying an additional traversed node to be accessed for responding to the additional graph query, the additional traversed node being connected to the additional target node;
determining that an additional access control cache associated with the additional target node does not include an access control rights entry for the additional traversed node;
based on the additional access control cache associated with the additional target node omitting an access control rights entry for the additional traversed node, verifying the access control rights of the user identifier with the additional traversed node;
after verifying the access control rights of the user identifier with the additional traversed node in connection with the additional graph query, receiving additional access control rights information from the additional traversed node, wherein the additional access control rights information is received in an additional separate communication; and
adding an access control rights entry for the additional traversed node to the additional access control cache of the additional traversed node that includes the additional access control rights information.

11. The computer-implemented method of claim 1, wherein the target node is located on a first computing device and the traversed node is located on a second computing device that is different from the first computing device.

12. The computer-implemented method of claim 11, wherein the traversed node being connected to the target node includes the traversed node being within a predetermined number of hops with the target node.

13. The computer-implemented method of claim 1, further updating a timestamp of the access control rights entry for the traversed node from the access control cache associated with the target node based on receiving access control rights information from the traversed node.

14. A system, comprising:
a knowledge graph comprising nodes connected via edge connections, including a target node, wherein the target node is connected to traversed nodes within a predetermined number of edge hops;
an access control cache of a target node, wherein the access control cache includes access control rights entries for a subset of traversed nodes that are connected to the target node;
at least one processor; and
a non-transitory computer memory comprising instructions that, when executed by the at least one processor, cause the system to:
based on receiving a graph query that includes a graph request and a user identifier, determining that the target node within the knowledge graph corresponds to the graph query;
based on the target node not satisfying one or more criteria of the graph query, identify a traversed node of the traversed nodes to be accessed for responding to the graph query;
determine that the user identifier has access control rights to access the traversed node based on accessing the access control cache of the target node, the access control cache of the target node having an access control rights entry for the traversed node in the access control cache of the target node; and
based on identifying from the access control cache of the target node that the user identifier has access control rights for the traversed node, accessing content of the traversed node in connection with responding to the graph query.

15. The system of claim 14, further comprising instructions that, when executed by the at least one processor, cause the system to:
receive, at the traversed node, a request to verify the access control rights of the user identifier with the traversed node; and
return a response to the request indicating that the user identifier has access to the traversed node.

16. The system of claim 15, further comprising instructions that, when executed by the at least one processor, cause the system to provide, after sending the response to the request and in a background process, access control rights information to the access control cache associated with the target node for all user identifiers or user groups having access control rights to the traversed node.

17. The system of claim 14, further comprising instructions that, when executed by the at least one processor, cause the system to:
receive, at a second computing device that hosts the traversed node and that is different from a first computing device that hosts the traversed node, a request to verify the access control rights of the user identifier with the traversed node;
return a response to the request indicating that the user identifier has access to the traversed node; and
determine, based on a request timestamp associated with the request being within an update threshold, not to send access control rights information for the traversed node to the access control cache associated with the target node.

18. A non-transitory computer-readable storage medium comprising instructions that, when executed by a processor, cause a computer device to carry out operations comprising:
based on receiving a graph query that includes a graph request and a user identifier, determining a target node in a knowledge graph that corresponds to the graph query, the knowledge graph having nodes connected via edges;
based on the target node not satisfying one or more criteria of the graph query, identifying a traversed node to be accessed for responding to the graph query, the traversed node being connected to the target node;
determining that the user identifier lacks access control rights to the traversed node based on accessing an access control cache of the target node, the access control cache of the target node having an access control rights entry for the traversed node in an access control cache associated with the target node; and
based on identifying from the access control cache of the target node that the user identifier lacks access control rights for the traversed node, denying access to content of the traversed node in connection with responding to the graph query.

19. The non-transitory computer-readable storage medium of claim 18, further comprising:
determining that the access control rights entry is stale;
removing the access control rights entry for the traversed node from the access control cache associated with the target node;

receiving, at the target node, an additional graph query associated with the user identifier;

based on the additional graph query, identifying the traversed node to be accessed for responding to the additional graph query; and based on not identifying the access control rights entry for the traversed node in an access control cache associated with the target node, verifying the access control rights of the user identifier with the traversed node.

20. The non-transitory computer-readable storage medium of claim 18, further comprising:

in response to receiving the graph query, determining a staleness of each access control rights entry in the access control cache for the target node based on a corresponding timestamp associated with each access control rights entry; and removing a given access control rights entry that exceeds a staleness threshold.

\* \* \* \* \*